United States Patent
Mohamed (10) Patent No.: US 10,094,980 B2
(45) Date of Patent: Oct. 9, 2018

(54) THREE-DIMENSIONAL SPACE-DIVISION Y-SPLITTER FOR MULTICORE OPTICAL FIBERS

(71) Applicant: KING SAUD UNIVERSITY, Riyadh (SA)

(72) Inventor: Ehab Salaheldin Awad Mohamed, Riyadh (SA)

(73) Assignee: King Saud University, Riyadh (SA)

( * ) Notice: Subject to any disclaimer, the term of this patent is extended or adjusted under 35 U.S.C. 154(b) by 30 days.

(21) Appl. No.: 14/994,034

(22) Filed: Jan. 12, 2016

(65) Prior Publication Data
US 2017/0199332 A1    Jul. 13, 2017

(51) Int. Cl.
G02B 6/28 (2006.01)
G02B 6/02 (2006.01)
G02B 3/00 (2006.01)
G02B 6/32 (2006.01)
G02B 6/293 (2006.01)

(52) U.S. Cl.
CPC .......... *G02B 6/2808* (2013.01); *G02B 3/0087* (2013.01); *G02B 6/02042* (2013.01); *G02B 6/2848* (2013.01); *G02B 6/2938* (2013.01); *G02B 6/32* (2013.01)

(58) Field of Classification Search
CPC .............. G02B 6/2808; G02B 6/02042; G02B 6/2848; G02B 6/2938; G02B 6/32; G02B 3/0087
See application file for complete search history.

(56) References Cited

U.S. PATENT DOCUMENTS

| | | | | | |
|---|---|---|---|---|---|
| 3,614,197 | A | * | 10/1971 | Nishizawa | C03B 17/025 250/227.28 |
| 4,285,570 | A | * | 8/1981 | Minemura | G02B 6/2808 385/33 |
| 4,522,461 | A | * | 6/1985 | Mannschke | G02B 3/0087 385/34 |
| 4,878,728 | A | * | 11/1989 | Mannschke | G02B 6/12002 385/14 |
| 5,016,963 | A | * | 5/1991 | Pan | G02B 6/245 385/115 |

(Continued)

FOREIGN PATENT DOCUMENTS

FR    2860599 A1 *  4/2005
FR    2860599 B1 *  2/2006

(Continued)

OTHER PUBLICATIONS

Charles et al., Techniques for Designing Physically Path-Length Matched Optical Circuitry, IQEC/CLEO Pacific Rim 2011, pp. 73-75.*

(Continued)

*Primary Examiner* — Peter Radkowski (57) ABSTRACT

The three-dimensional space-division Y-splitter for multi-core optical fibers (MCF) is a 3-D device that depends on space-division splitting (SDS) by double-hump graded-index (DHGI) in a rectangular waveguide. It includes multiple single Y-splitters, each one being dedicated to one MCF core. Each Y-splitter layer has three stages, including an expander; a DHGI-SDS; and a separator. The net result of the Y-splitter is that the signal in a single multi-core fiber input has its optical power split 50-50 between two multi-core fiber outputs without an intermediate single-core single-mode fiber (SMF) conversion stage.

14 Claims, 8 Drawing Sheets

(56) References Cited

U.S. PATENT DOCUMENTS

| | | | | |
|---|---|---|---|---|
| 5,117,473 A * | 5/1992 | Pan | G02B 6/245 | 385/33 |
| 5,125,946 A * | 6/1992 | Bhagavatula | G02B 6/13 | 216/24 |
| 5,838,849 A | 11/1998 | Shirasaki | | |
| 5,887,097 A * | 3/1999 | Henry | G02B 6/125 | 372/6 |
| 5,909,529 A * | 6/1999 | Bhagavatula | G02B 6/1245 | 385/129 |
| 6,236,784 B1 * | 5/2001 | Ido | G02B 6/125 | 385/39 |
| 6,434,294 B1 * | 8/2002 | Gallo | G02B 6/12004 | 372/20 |
| 6,542,671 B1 * | 4/2003 | Ma | G02B 6/12002 | 385/132 |
| 6,768,850 B2 * | 7/2004 | Dugan | G02B 6/122 | 385/124 |
| 6,813,405 B1 * | 11/2004 | Bendett | G02B 6/125 | 385/14 |
| 6,845,197 B2 * | 1/2005 | Lam | G02B 6/125 | 385/45 |
| 7,054,070 B2 * | 5/2006 | Matsumoto | G02B 3/0087 | 359/652 |
| 7,190,864 B2 * | 3/2007 | Jiang | G02B 6/4206 | 385/123 |
| 7,236,660 B2 * | 6/2007 | Ducellier | G02B 6/12011 | 385/16 |
| 7,266,277 B2 * | 9/2007 | Hamada | G02B 6/138 | 385/129 |
| 7,286,765 B2 * | 10/2007 | Noirie | H04J 14/0212 | 398/49 |
| 7,391,940 B2 * | 6/2008 | Bryan | G02B 6/12002 | 385/15 |
| 7,587,110 B2 * | 9/2009 | Singh | G02B 6/02042 | 385/126 |
| 7,653,278 B2 * | 1/2010 | Hamada | G02B 1/045 | 385/129 |
| 7,764,854 B2 * | 7/2010 | Fini | G02B 6/02009 | 385/123 |
| 7,783,149 B2 * | 8/2010 | Fini | G02B 6/02009 | 372/6 |
| 7,876,495 B1 * | 1/2011 | Minelly | C03B 37/0122 | 359/341.1 |
| 7,920,767 B2 * | 4/2011 | Fini | G02B 6/02023 | 385/123 |
| 7,924,500 B1 * | 4/2011 | Minelly | G02B 6/023 | 359/341.1 |
| 8,526,110 B1 * | 9/2013 | Honea | H01S 3/06791 | 359/556 |
| 8,725,001 B2 | 5/2014 | Fini et al. | | |
| 8,805,146 B2 * | 8/2014 | Sasaoka | G02B 6/02042 | 385/126 |
| 8,861,914 B2 * | 10/2014 | Hayashi | G02B 6/02042 | 385/126 |
| 9,031,368 B2 * | 5/2015 | Hayashi | G02B 6/02042 | 385/100 |
| 9,052,432 B2 * | 6/2015 | Yao | G02B 6/02042 | |
| 9,164,228 B2 * | 10/2015 | Hayashi | G02B 6/02042 | |
| 9,203,542 B2 * | 12/2015 | Simonneau | H04Q 11/0005 | |
| 9,207,395 B2 * | 12/2015 | Fini | G02B 6/02009 | |
| 9,250,384 B2 * | 2/2016 | Matsuo | G02B 6/02042 | |
| 9,335,477 B2 * | 5/2016 | Fontaine | G02B 6/28 | |
| 9,400,169 B2 * | 7/2016 | Zhou | G01B 9/02004 | |
| 2002/0176677 A1 * | 11/2002 | Kumar | C03B 37/01222 | 385/126 |
| 2003/0035640 A1 * | 2/2003 | Dugan | G02B 6/122 | 385/124 |
| 2003/0174960 A1 * | 9/2003 | Lam | G02B 6/125 | 385/48 |
| 2003/0185514 A1 * | 10/2003 | Bendett | G02B 6/125 | 385/48 |
| 2004/0131321 A1 * | 7/2004 | Kubo | G02B 6/0281 | 385/124 |
| 2004/0264967 A1 * | 12/2004 | Noirie | H04J 14/0212 | 398/85 |
| 2005/0007675 A1 * | 1/2005 | Matsumoto | G02B 3/0087 | 359/652 |
| 2005/0220401 A1 * | 10/2005 | Jiang | G02B 6/4206 | 385/28 |
| 2005/0259935 A1 * | 11/2005 | Hamada | G02B 6/138 | 385/129 |
| 2006/0072866 A1 * | 4/2006 | Mizuno | G02B 6/12007 | 385/1 |
| 2006/0215976 A1 * | 9/2006 | Singh | G02B 6/02042 | 385/126 |
| 2007/0104417 A1 * | 5/2007 | Tanaka | G02F 1/293 | 385/16 |
| 2007/0116409 A1 * | 5/2007 | Bryan | G02B 6/12002 | 385/33 |
| 2007/0147751 A1 * | 6/2007 | Fini | G02B 6/02009 | 385/123 |
| 2007/0159682 A1 * | 7/2007 | Tanaka | H04Q 11/0005 | 359/320 |
| 2008/0193077 A1 * | 8/2008 | Grossard | G02B 6/125 | 385/14 |
| 2008/0193082 A1 * | 8/2008 | Hamada | G02B 1/045 | 385/33 |
| 2008/0260386 A1 * | 10/2008 | Boduch | H04J 14/0204 | 398/83 |
| 2009/0034059 A1 * | 2/2009 | Fini | G02B 6/02023 | 359/341.3 |
| 2009/0059353 A1 * | 3/2009 | Fini | G02B 6/02009 | 359/341.3 |
| 2011/0206330 A1 * | 8/2011 | Sasaoka | G02B 6/105 | 385/126 |
| 2011/0243517 A1 * | 10/2011 | Kokubun | G02B 6/02042 | 385/123 |
| 2011/0274398 A1 * | 11/2011 | Fini | G02B 6/02042 | 385/124 |
| 2011/0274435 A1 * | 11/2011 | Fini | G02B 6/02042 | 398/139 |
| 2012/0294607 A1 * | 11/2012 | Winzer | H01S 3/094061 | 398/28 |
| 2013/0016949 A1 * | 1/2013 | Yao | G02B 6/02042 | 385/126 |
| 2013/0123648 A1 * | 5/2013 | Stampoulidis | A61N 5/062 | 600/478 |
| 2013/0251320 A1 * | 9/2013 | Hayashi | G02B 6/02042 | 385/100 |
| 2013/0251324 A1 * | 9/2013 | Fini | G02B 6/02009 | 385/124 |
| 2013/0301998 A1 * | 11/2013 | Hayashi | G02B 6/02042 | 385/100 |
| 2013/0308913 A1 * | 11/2013 | Tanigawa | G02B 6/02042 | 385/126 |
| 2014/0079353 A1 * | 3/2014 | Fontaine | G02B 6/28 | 385/14 |
| 2014/0140694 A1 * | 5/2014 | Zhou | H04J 14/04 | 398/44 |
| 2014/0153882 A1 * | 6/2014 | Hayashi | G02B 6/02042 | 385/100 |
| 2014/0160488 A1 * | 6/2014 | Zhou | G01B 9/02004 | 356/479 |
| 2014/0178018 A1 * | 6/2014 | Matsuo | G02B 6/02042 | 385/98 |
| 2014/0219613 A1 * | 8/2014 | Nielson | G02B 6/3885 | 385/78 |
| 2014/0219657 A1 * | 8/2014 | Simonneau | H04Q 11/0005 | 398/49 |
| 2015/0085352 A1 | 3/2015 | Ryf et al. | | |
| 2015/0293300 A1 * | 10/2015 | Fini | G02B 6/0285 | 385/124 |

FOREIGN PATENT DOCUMENTS

| | | | |
|---|---|---|---|
| JP | 11109162 A | * | 4/1999 |
| JP | 2003021795 A | * | 1/2003 |

(56) References Cited

FOREIGN PATENT DOCUMENTS

| JP | 2006030426 A | * | 2/2006 | |
| WO | WO 2013041456 A1 | * | 3/2013 | ......... H04Q 11/0005 |

OTHER PUBLICATIONS

Francois, Millimeter-Bending-Radius Fiber Bus for Optical Interconnects, WD5 (Oral), 2013.*

Guha et al., Minimizing temperature sensitivity of silicon Mach-Zehnder interferometers. Opt. Express 18,1879-1887 (2010).*

Imamura et al., Effective Space Division Multiplexing by Multi-Core Fibers, ECOC 2010, p. 1.09.*

Kanamori, Passive Optical Components and Their Applications to FTTH Networks, SEI Technical Review, No. 73, Oct. 2011, p. 14.*

Li et al., Space-division multiplexing: the next frontier in optical communication, Adv. Opt. Photon. 6, 413-487 (2014).*

Awad, Ehab, "Multicore optical fiber Y-splitter," Opt. Express 23, 25661-25674 (2015).*

Reitterer, Jorg, Numerical Analysis of Optical Multi-Core Waveguides, Institut fur Nachrichtentechnik und Hochfrequenztechnik der Technischen Universitat Wien, Jun. 2010.*

Vardhani et al., Design and Simulation of 1x2 Y-branch optical power splitter with s-bend waveguide and study on the Variation of Transmitted power with Variation of Components Width , International Journal of Current Engineering and Technology, vol. 3, No. 4 (Oct. 2013), p. 1293.*

Fukazawa et al., Low Loss Intersection of Si Photonic Wire Waveguides, Japanese Journal of Applied Physics, vol. 43, No. 2, pp. 646-647, 2004.*

Richardson, D. J., J. M. Fini, and L. E. Nelson. "Space-division multiplexing in optical fibres." Nature Photonics 7.5 (2013): 354-362.

Mizuno, Takayuki, et al., "Dense Space Division Multiplexed Transmission Systems using Multi-core and Multi-mode Fiber." Lightwave Technology, Journal of, vol. PP, Issue 99, Sep. 28, 2015.

* cited by examiner

THREE-DIMENSIONAL SPACE-DIVISION Y-SPLITTER FOR MULTICORE OPTICAL FIBERS

BACKGROUND OF THE INVENTION

1. Field of the Invention

The present invention relates generally to optical fiber communications systems, and particularly to a three-dimensional (3D) space-division Y-splitter for multicore optical fibers (MCF).

2. Description of the Related Art

Space division multiplexing (SDM) is considered one of the key solutions in next generation high capacity optical fiber networks. Current network capacity is growing exponentially and approaching its final limit, despite the use of many different solutions, such as time-division-multiplexing (TDM), dense-wavelength-division-multiplexing (DWDM), polarization-division-multiplexing (PDM), and complex modulation formats. Multicore optical fiber (MCF) is considered one of SDM approaches that has the potential to break such capacity limits in future optical networks. A MCF consists of multiple cores arranged in a certain configuration within the same cladding region. Each core can transmit the same set of different TDM, WDM, and/or PDM channels, and thus it can simply multiply the network capacity. However, this MCF potential cannot be fully exploited, unless suitable MCF devices are provided to perform mandatory and conventional signal-processing operations on propagating data during transmission. Relying on the current traditional solutions of converting back and forth between MCF and single-core single-mode fiber (SMF) to perform such operations imposes a bottle-neck that compromises the high capacity advantages of MCF networks. It is crucial to have high performance novel devices that can be connected directly to MCFs without conversion to conventional single-core fibers.

Thus, a three-dimensional space-division Y-splitter for multicore optical fibers solving the aforementioned problems is desired.

SUMMARY OF THE INVENTION

The three-dimensional space-division Y-splitter for multicore optical fibers (MCF) is a 3-D device that depends on space-division splitting (SDS) by double-hump graded-index (DHGI) in a rectangular waveguide. It includes multiple single Y-splitters, each one being dedicated to one MCF core. Each Y-splitter layer has three stages, including an expander; a DHGI-SDS; and a separator. The net result of the Y-splitter is that the signal in a single multi-core fiber input has its optical power split 50-50 between two multi-core fiber outputs without an intermediate single-core single-mode fiber (SMF) conversion stage.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1A:
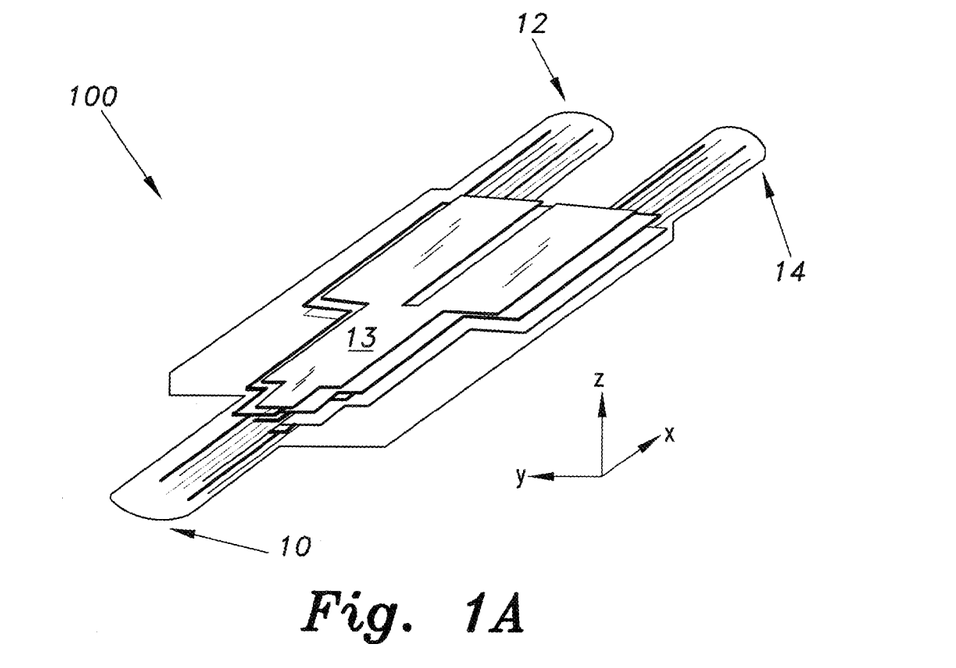
FIG. 1A is a schematic diagram of a three-dimensional space-division Y-splitter for multicore optical fibers (MCF) according to the present invention, shown between a 7-core MCF input and two 7-core MCF outputs.

The three-dimensional space-division Y-splitter for multicore optical fibers 100 is a 3-D device that depends on space-division splitting (SDS) by double-hump graded-index (DHGI) multicore optical fiber in a rectangular waveguide. It includes multiple single Y-splitters (also referred to herein as sub-splitters), each one being dedicated to one MCF core. Each sub-splitter has three stages (shown in FIG. 2A), including an expander 202, a double-hump graded-index space division splitter 203 (DHGI-SDS), and a separator 204. As shown in FIG. 1A, the input multicore optical fiber (MCF) 10 is disposed at a first end of the device 100, while output MCFs 12 and 14 are disposed at the opposing end of the device 100.

The present Y-splitter mainly depends on space-division splitting (SDS) by double-hump graded-index (DHGI) multicore optical fibers in a rectangular waveguide 13. It consists of multiple single Y-splitters, each sub-splitter being dedicated to one MCF core. Each sub-splitter has three stages, including an expander, a DHGI-SDS, and a separator. FIG. 1A shows the 3-D schematic diagram of the Y-splitter together with input and output MCFs. The selected MCFs here have seven homogeneous, identical step-index, single-mode cores arranged in a triangular lattice. The core and cladding diameters are 9 µm and 125 µm, respectively. The separation between adjacent cores is 40 µm. The cladding refractive index is 1.45, and the relative refractive index difference is 0.35%, resulting in a core refractive index of ≈1.4551.

The 3-D Y-splitter 100 consists of seven single sub-splitters. Each sub Y-splitter connects one of the input MCF cores to two corresponding MCF output cores. A sub Y-splitter consists of three stages of rectangular waveguides (WG) that have dimensions and refractive indices as discussed infra. The seven Y-splitters are surrounded everywhere by a cladding region (400×125 µm) with 1.45 refractive index that matches the refractive index of each MCF's cladding.

Figure 1B:
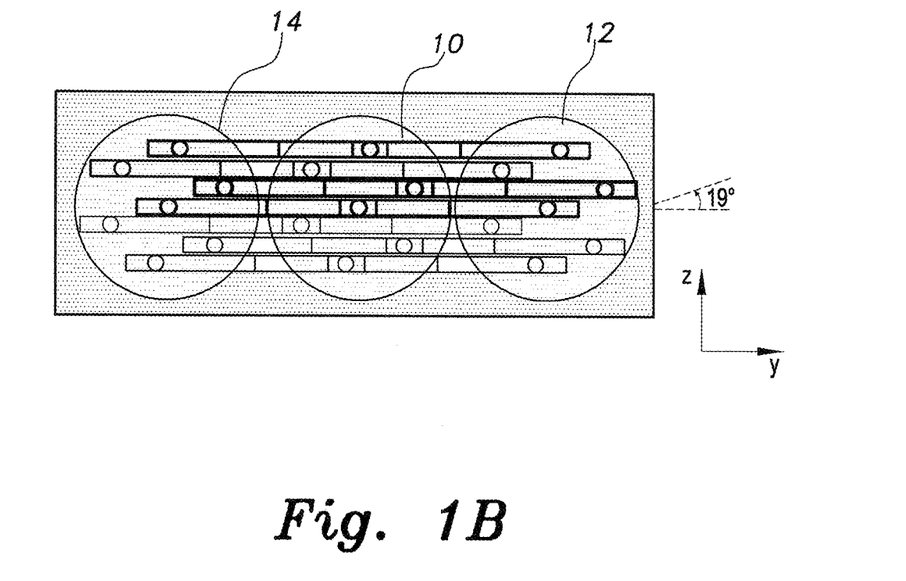
FIG. 1B is a schematic transverse cross section of the Y-splitter of FIG. 1, showing the seven Y-sub-splitters as seven rectangular waveguides vertically, each waveguide including an input core flanked by two output cores on opposite sides of the input core.

FIG. 1B shows a 2-D schematic front-view of the Y-splitter and the three connected MCFs. It demonstrates the arrangement of rectangular waveguides (WGs), together with MCF cores and the cladding region. The separation between output MCFs 12 and 14 is selected to be equal to one MCF diameter (125 µm). The seven Y-sub-splitters WGs are shown as rectangles, each comprising an input core in the middle and two output cores on opposite sides of the middle input core. All rectangular WGs have equal heights of 9 µm. The MCFs are rotated by 19° around their longitudinal axis in order to have a line-of-sight view between cores of each single sub-splitter, resulting in a vertical separation between adjacent WGs equals to 4 µm. In order to ensure vertical de-coupling between those adjacent WGs, a thin isolation layer (2 µm) with a lower refractive index (1.44) than the cladding region (1.45) is inserted midway between each adjacent WG. This isolation layer (not shown in the figures for simplicity) forms trenches that help in reducing cross-talk between WGs.

Figure 2A:
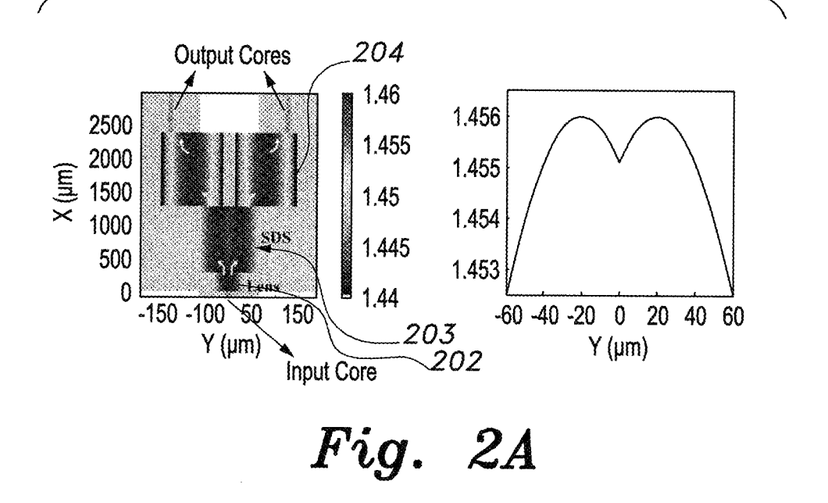
FIG. 2A is a refractive index profile of a typical second-stage space division splitter (SDS) in each sub-splitter of the Y-splitter of FIG. 1A and a graph of its corresponding double-hump graded refractive index (DHGI) profile.

FIG. 2A illustrates a refractive index profile of a single Y-sub-splitter, together with its three stages, showing its dimensions and refractive indices. A graded-index (GRIN) lens 202 forms the first stage expander, which acts to expand the input core beam slightly. The rectangular WG lens (280×60×9 µm) has the index profile:

$$n_1(y)=n_o-8*10^{-6}y^2, \quad (1)$$

where $n_o$=1.46, and the 'y' dimension is measured in 'µm', as shown in FIG. 2A. This gentle parabolic index is optimized to have a small slope in order to act as a taper that gradually expands the input beam adiabatically, and thus reduces the number of excited higher order modes. That helps eventually in matching the fundamental mode of output cores, both in size and profile, and thus avoiding too much coupling loss.

The second stage, SDS 203, is the main splitter operation stage, which is composed of a rectangular WG that has a centered double-hump graded refractive index (DHGI) profile, as illustrated in the graph of FIG. 2A. The double-hump center is aligned with the lens central axis. Each hump has a dimension of 995×60×9 µm. Each single hump has a parabolic profile:

$$n_2(y)=n_o-4.4*10^{-6}(y\pm20)^2, \quad (2)$$

where 20 and −20 µm correspond to the left (−60 µm<y<0) and right (0<y<60 µm) hump, respectively. The SDS splitting occurs by using the total internal reflection (TIR) phenomenon. The DHGI imposes a low refractive index region at the middle of the lens output, which increases gently when moving away from the DHGI mid region. Thus, it divides the expanded beam equally in space by TIR, forcing 50% of optical power to deflect to the right-hand side and 50% to deflect to the left-hand side (as indicated by white arrows in FIG. 2A). When the split beams reach the lower refractive index region at WG opposite sides, they deflect again by TIR and propagate along the x-direction into the third stage. Therefore, the second stage is considered the main part that Y-space-division splits (Y-SDS) the input beam. Thus, the Y-splitter demonstrates a 50/50 space-division splitter (SDS) using a DHGI rectangular WG.

The third stage separator 204 is used to separate the split beams coming out of the second stage far apart in order to de-couple them completely, and also to choose the separation between output MCFs. This stage's center is aligned with the second stage central axis. It includes two rectangular WGs, each one (1090×133×9 µm) having the graded-index profile:

$$n_3(y)=n_o-4.4*10^{-6}(y\pm78.5)^2, \quad (3)$$

where the right and left WGs are centered at 78.5 µm and −78.5 µm, respectively, and the overall separation between output split beams is adjusted at 2×125-250 µm. The WGs act as beam deflectors. The graded index profile deflects the input beam by TIR toward each waveguide center, and then the deflected beam continues to reach the WG other side, where it deflects again by TIR into the corresponding output cores. The amount of separation between output split beams can be simply controlled, as it is directly proportional to the WGs y-dimension.

It is worth mentioning that all graded refractive indices of the three stages are chosen to have a parabolic profile in order to minimize intermodal dispersion. Thus, together with the device's short length 2.4 mm), it is expected to have a negligible overall dispersion. Moreover, it should be understood that the propagating beams are mono-mode across the rectangular WGs z-dimension, as have been demonstrated through EME simulations.

Figure 2B:
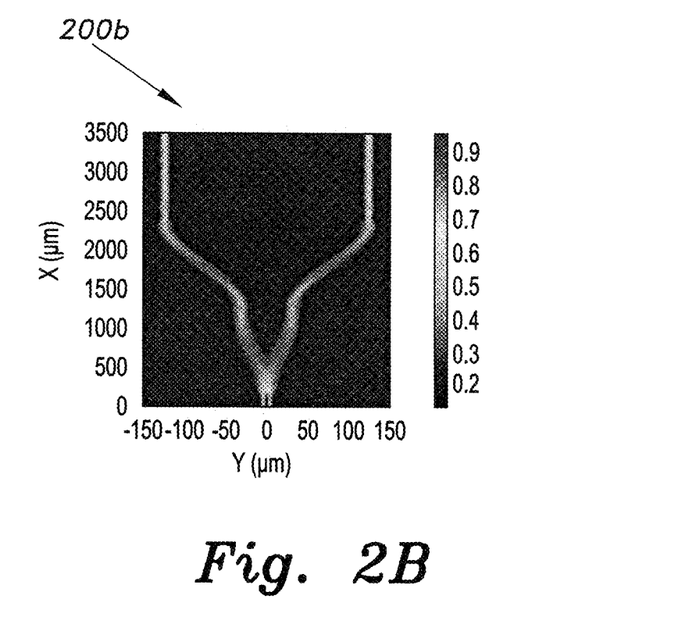
FIG. 2B is a finite-difference time-domain (FDTD) simulation of electric field magnitude of the sub-splitter of FIG. 2A.
Figure 3A:
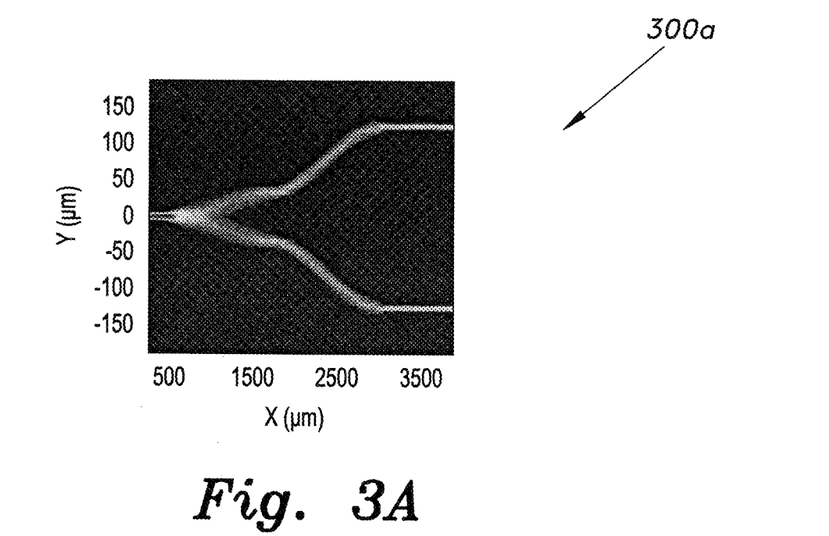
FIGS. 3A, 3B, 3C, 3D, 3E, 3F, and 3G are eigenmode expansion (EME) simulations showing longitudinal cross sections of the first through seventh sub-splitters of the Y-splitter of FIG. 1A, showing each input core connected to its corresponding output cores, respectively.
Figure 3B:
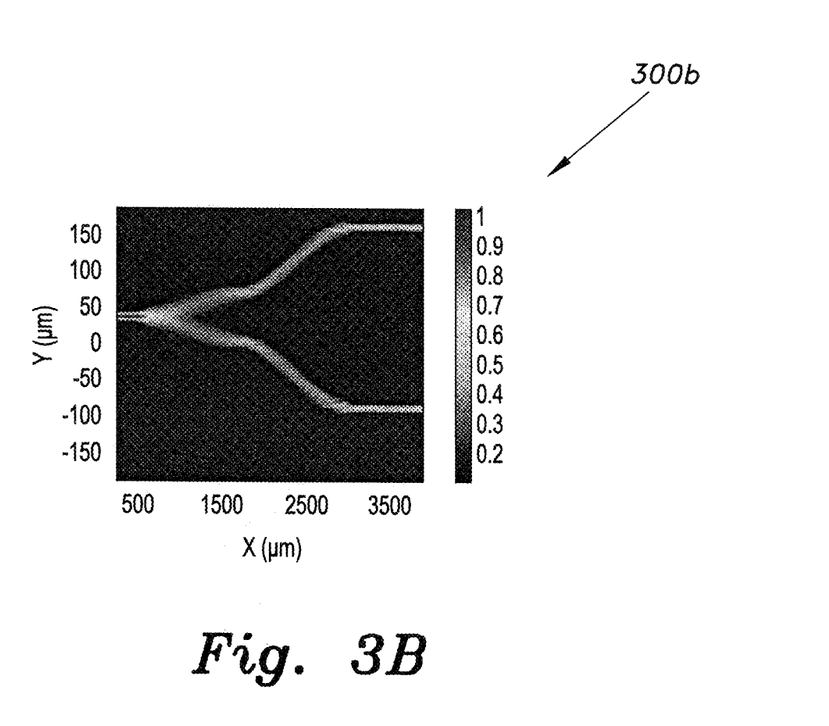
Figure 3C:
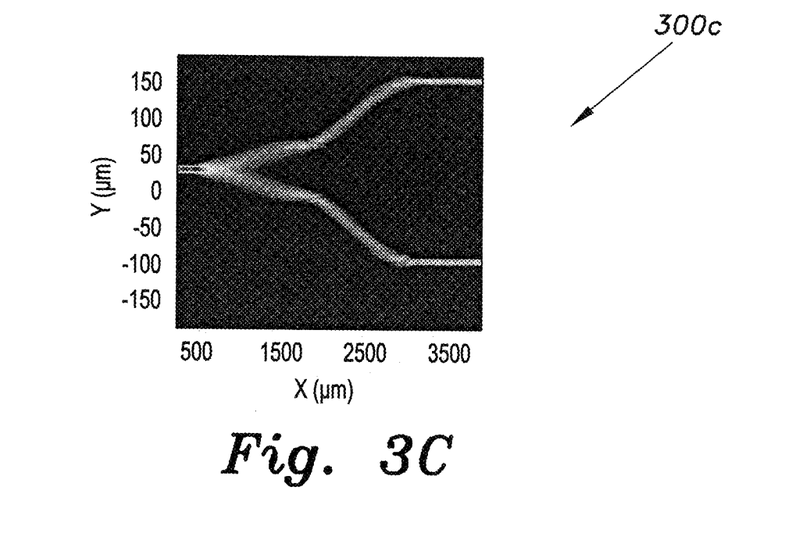
Figure 3D:
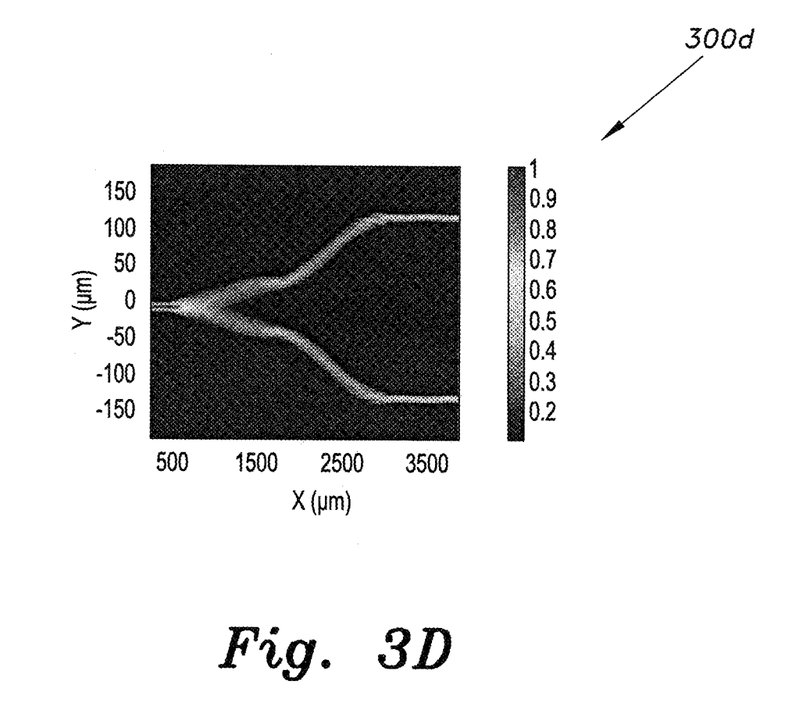
Figure 3E:
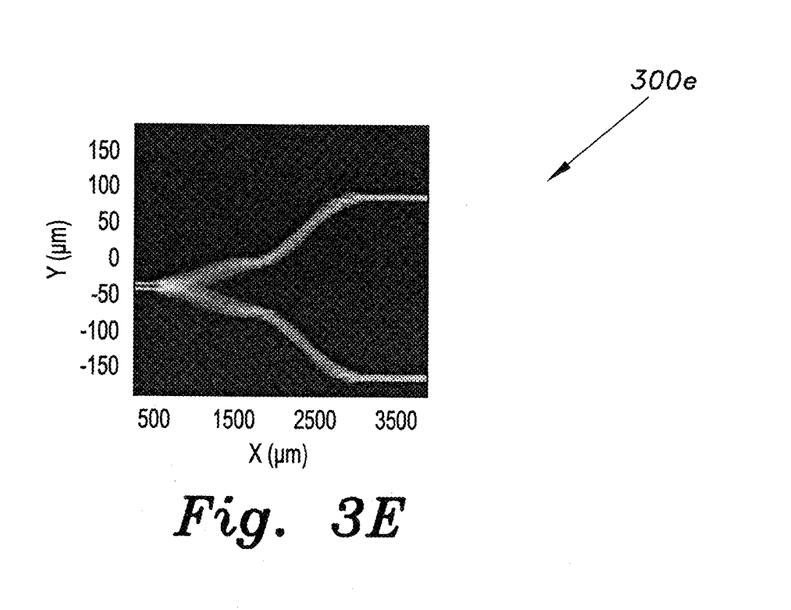
Figure 3F:
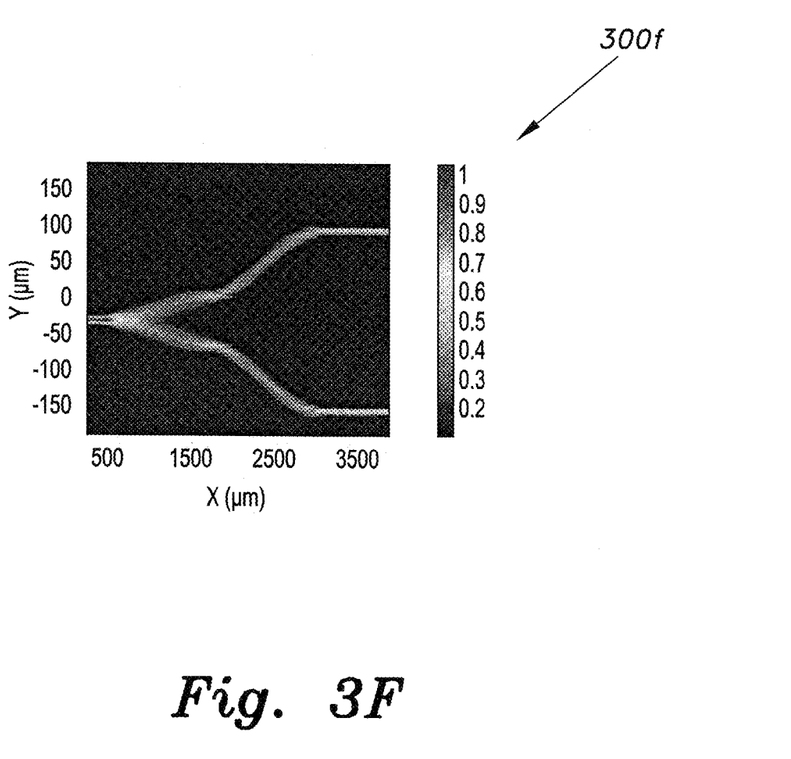
Figure 3G:
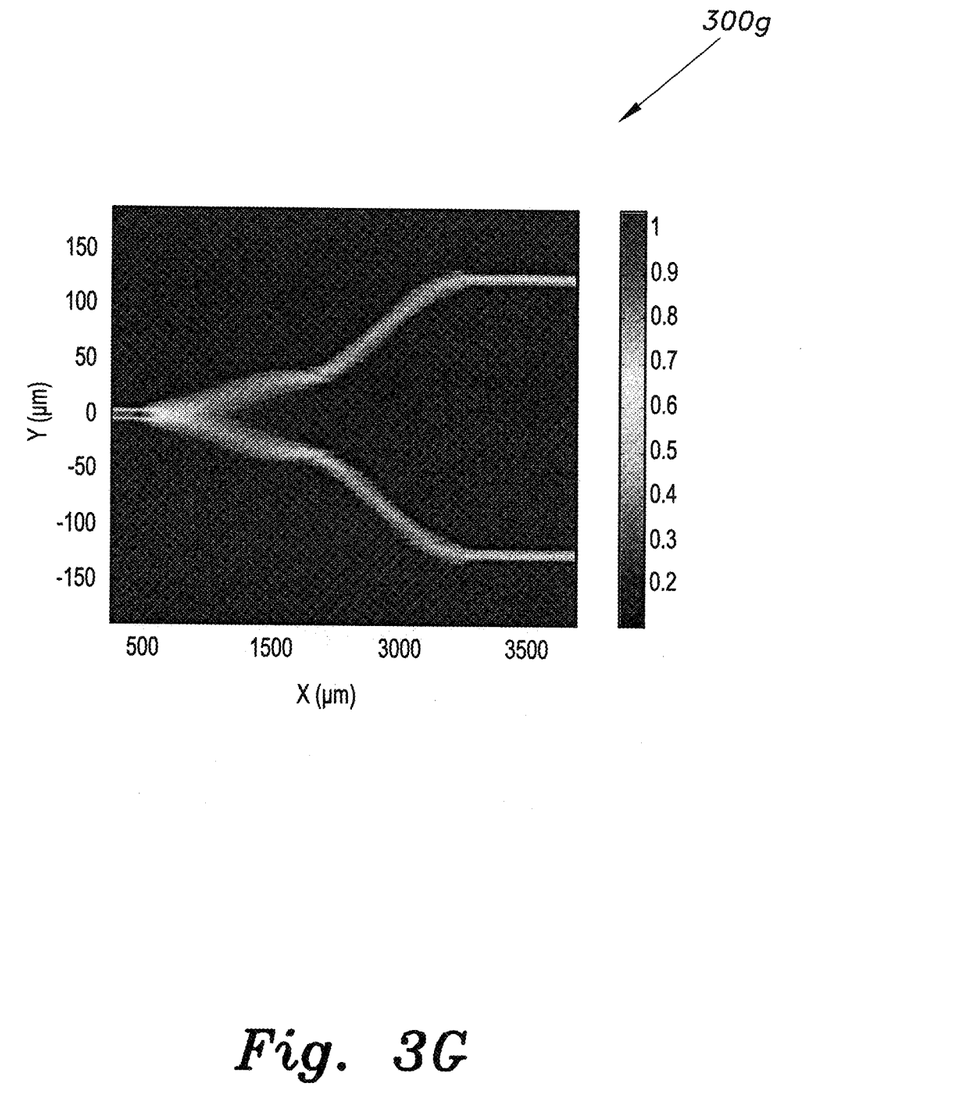
Figure 4A:
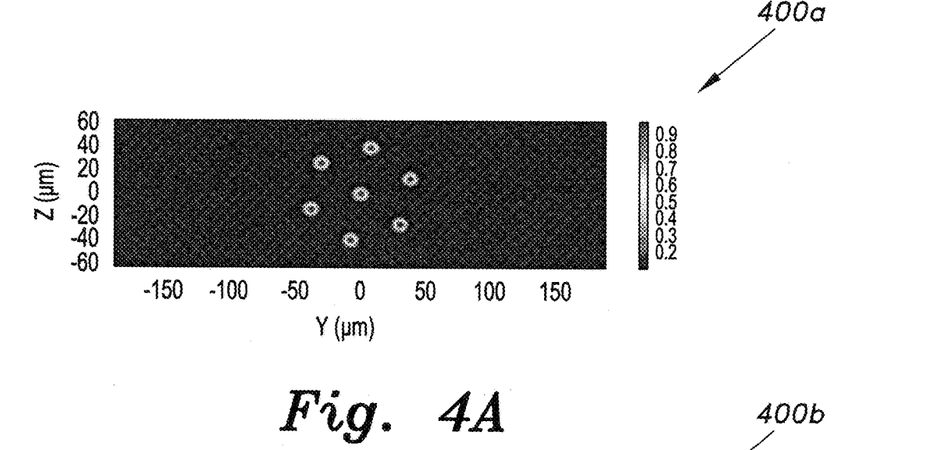
FIG. 4A is an eigenmode expansion (EME) simulation showing a transverse cross section of an input MCF of a three-dimensional space-division Y-splitter for multicore optical fibers (MCF) according to the present invention.
Figure 4B:
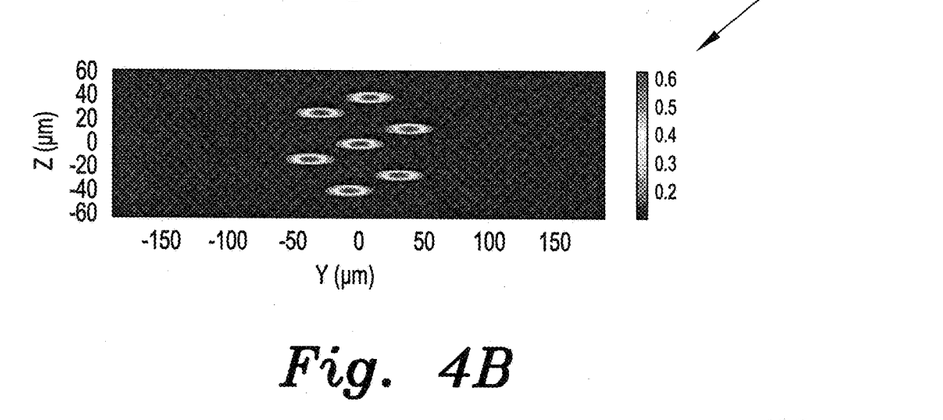
FIG. 4B is an eigenmode expansion (EME) simulation showing a transverse cross section of the lenses of the sub-splitters of a three-dimensional space-division Y-splitter for multicore optical fibers (MCF) according to the present invention.
Figure 4C:
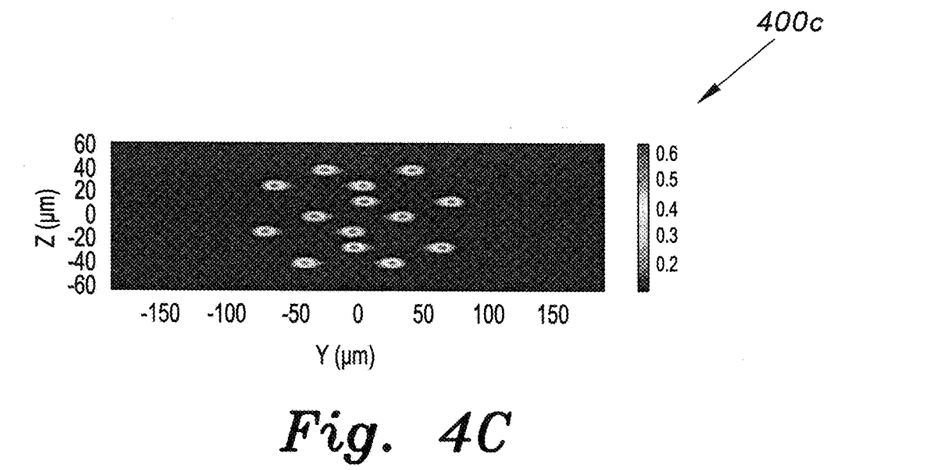
FIG. 4C is an eigenmode expansion (EME) simulation showing a transverse cross section of the SDS of the sub-splitters of a three-dimensional space-division Y-splitter for multicore optical fibers (MCF) according to the present invention.
Figure 4D:
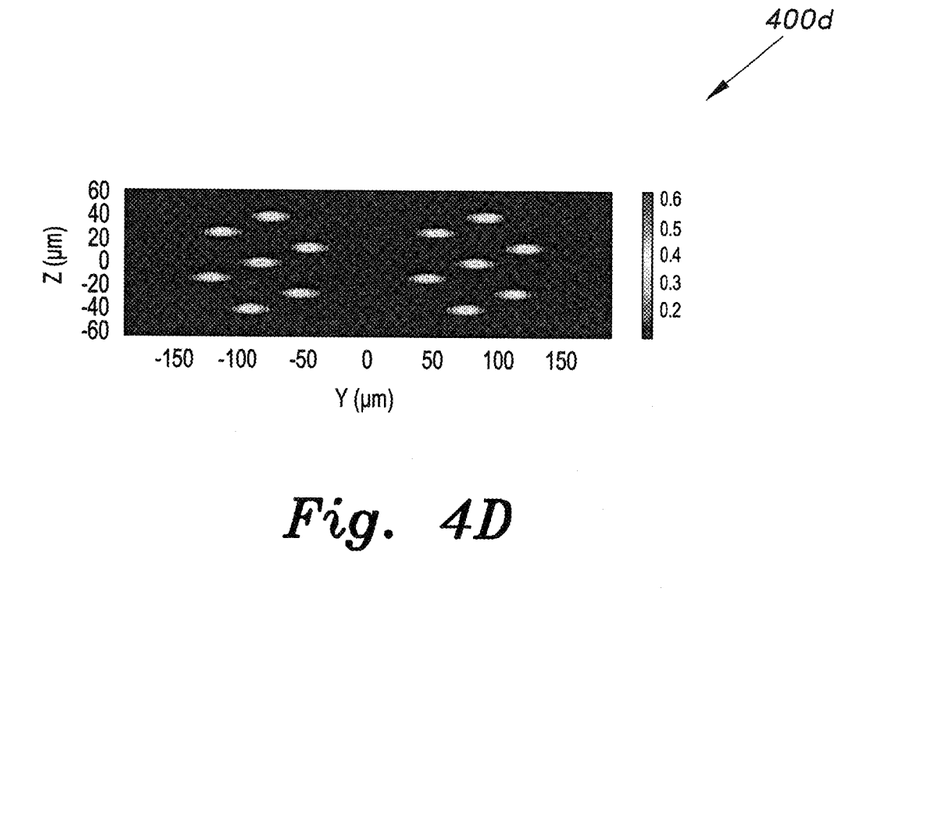
FIG. 4D is an eigenmode expansion (EME) simulation showing a transverse cross section of the separators of the sub-splitters of a three-dimensional space-division Y-splitter for multicore optical fibers (MCF) according to the present invention.
Figure 4E:
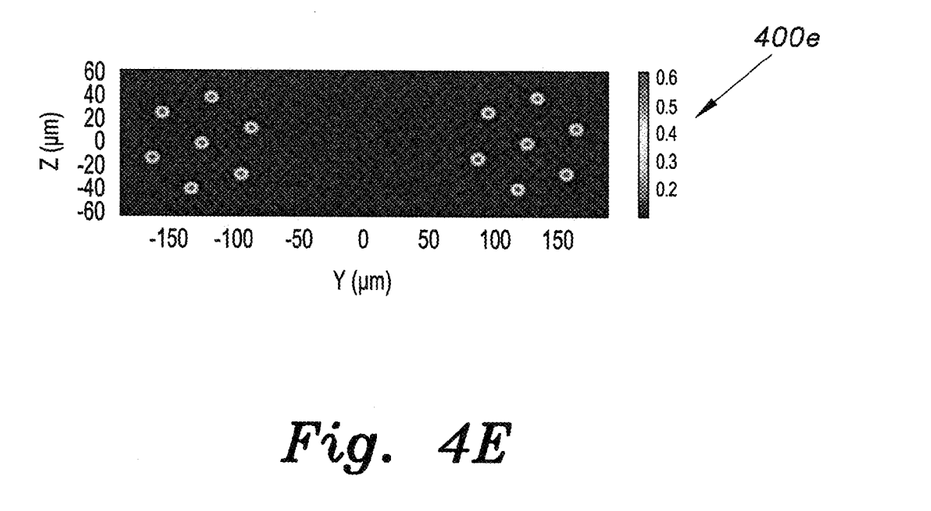
FIG. 4E is an eigenmode expansion (EME) simulation showing a transverse cross section of the output MCFs of a three-dimensional space-division Y-splitter for multicore optical fibers (MCF) according to the present invention.

The finite-difference time-domain (FDTD) simulation of electric field magnitudes (|E|) for one Y-sub-splitter is performed to verify device operation. FIG. 2B shows a 2-D cross section 200b of the simulated electric field at an operating wavelength of 1555 nm. The input core (9 µm in diameter) has a fundamental Gaussian mode propagating along the x-direction. In the first stage, the graded index lens 202 expands the input beam across the y-direction to reach a total width of ≈18 µm. In the second stage 203, the DHGI WG splits the expanded beam into two beams with a 50/50 splitting ratio. As seen, each split beam is deflected by TIR at the second stage output to continue propagation along the x-direction. In the third stage, separators 204 deflect the beams away from each other by TIR until they reach the third stage output, where they deflect again by TIR in order to continue in the x-direction to the output MCF cores 12 and 14. The fundamental mode of the input core has a maximum |E|=1 arbitrary unit, while the fundamental modes of the output cores have 50/50 splitting ratio, with a maximum |E|≈0.64 arbitrary unit corresponding to intensities proportional to |E|²≈0.4. The overall separation between output cores is exactly 250 µm.

The eigenmode expansion (EME) solver is utilized to simulate the 3-D field propagation along the entire Y-splitter structure, together with the three connected 7-core MCFs. The simulation is carried out at operating wavelength of 1555 nm. The EME allows simultaneous propagation of all fundamental modes of input MCF cores through the Y-splitter rectangular WGs up to the two output MCFs cores. EME simulations 300a-300g of FIGS. 3A-3G show seven longitudinal cross sections of propagating modes (|E|) from input cores 1 through 7, respectively, to their corresponding output cores. As seen, the Y-splitters have different y-positions with respect to each other, depending on their relative position to the input/output cores. EME simulations 400a-400e of FIGS. 4A-4E show five selected transverse cross sections of the Y-splitter and the MCFs along the propagation direction. Each cross section shows seven different beam profiles, wherein each beam profile corresponds to one sub-splitter element. The cross sections correspond to the input MCF cores, the lenses, the SDSs, the separators, and the output MCF cores, respectively. EME simulation 400a shows the Gaussian fundamental modes of the single-mode input cores. In EME simulation 400e of FIG. 4E, it is clear that the output has a splitting ratio of 50/50 between the two output MCFs, and each output core preserves the fundamental mode distribution corresponding to the input cores.

In all these transverse cross sections, there is no significant sign of cross-coupling across the cladding region between WGs or cores, which indicates non-significant induced crosstalks and back reflections among cores and different Y-sub-splitter elements.

Thus, the Y-splitter device 100 directly splits the optical power of the input MCF 10 into two output MCFs 12, 14 without conversion to a single-mode fiber (SMF). The three-dimensional device has three stages, including an expander 202, a SDS splitter 203, and a separator 204. The second stage space-division splitter (SDS) 203 splits input beam power by one-half using a double-hump graded-index (DHGI) profile. The first stage is a GRIN lens 202 having an optimized parabolic index that acts as a taper to gradually expand the input beam adiabatically. Thus, it reduces the number of excited higher order modes and helps in matching the fundamental mode of output MCF cores 12, 14 in size and profile. The third stage (separator 204) has a graded-index profile that deflects the split beams apart by using the total internal reflection (TIR) physical phenomenon. The overall length of the device is 2.4 mm, which is short and compact in size when compared to other conventional couplers for single-mode fibers.

The Y-splitting can be generally applied to other MCFs types with various core-lattice configurations, dimensions, and refractive-indices given that MCFs can be rotated in such a way to allow each single sub-splitter input and output cores to have a line-of-sight view. The aforementioned DHGI equations' values, Y-splitter dimensions as well as nominal values of material's refractive-indices are some example values that may vary depending on the utilized MCFs types.

The Y-splitter device 100 shows excellent performance over a wideband wavelength range (S, C, L, and U bands) with polarization insensitive operation. The performance variations from one core to another are considered very small.

The Y-splitter device 100 shows a good performance tolerance to MCF parameter variations, such as core diameters and refractive indices, which may exist in practical systems to mitigate transmission impairments.

The Y-splitter device 100 shows good performance tolerance to design parameter variations, which indicates relaxed constraints on fabrication errors margin and sensitivity. The Y-splitter device 100 can be easily fabricated with high precision and reproducibility using the flame hydrolysis deposition method.

All these features are considered very attractive for the next generation high capacity MCF networks, in addition to other different emerging MCF applications, such as SDM amplification, optical sensors, and chip interconnections.

It is to be understood that the present invention is not limited to the embodiments described above, but encompasses any and all embodiments within the scope of the following claims.

I claim:
1. A three-dimensional space-division Y-splitter for multicore optical fibers, comprising:
an input leg adapted for connection to an input multicore optical fiber;
two output legs adapted for connection to two output multicore optical fibers, the input multicore optical fiber and the two output multicore optical fibers each having the same number of independent cores, wherein the multicore optical fibers include a longitudinal axis and are disposed in a manner that is rotated by 19° around their longitudinal axis thereby providing a line-of-sight view between cores in the waveguide of each Y-splitter; and
a plurality of Y-sub-splitters equal to the number of cores in the input multicore optical fiber, each of the Y-sub-splitters being connected between a unique one of the cores of the input multicore optical fiber and a corresponding core of each of the two output multicore optical fibers, each of the Y-sub-splitters having a space division splitter splitting an input optical beam in the corresponding input core into two identical output optical beams of one-half the power of the input optical beam, wherein each of the Y-sub-splitters are configured so as to allow line-of-sight view among the respective cores without any crossings thereby reducing the cross-talk between each Y-splitter's two output legs, wherein each said Y-sub-splitter comprises:
i) an expander for expanding the input optical beam to produce an output wherein the expander comprises a graded-index (GRIN) rectangular waveguide lens, the rectangular waveguide lens having a constant refractive index profile, wherein the index profile defines a parabolic index optimized to have a small slope;
ii) the space division splitter being a double-hump graded refractive index splitter defining a rectangular waveguide having a central input core and two lateral output cores on opposite sides of the central input core, the output of the expander optically feeding the space division splitter, the splitter producing two output beams, wherein the rectangular waveguide lens has a refractive index profile distributed along a waveguide width of 60 μm; and
iii) a separator defining two laterally separated waveguides receiving the two output beams of the splitter and separating the two output beams for transmission to the corresponding cores of the two output multicore optical fibers.

2. The three-dimensional space-division Y-splitter for multicore optical fibers according to claim 1, wherein said rectangular waveguide lens has dimensions 280×60×9 am and has the refractive index profile characterized by the relation:

$$n_1(y) = n_o - 8 * 10^{-6} y^2,$$

where $n_o = 1.46$ and the 'y' dimension is measured in 'μm', the index profile providing the parabolic index optimized to have the small slope in order to act as a taper gradually expanding the input beam adiabatically, thereby reducing excited higher order modes.

3. The three-dimensional space-division Y-splitter for multicore optical fibers according to claim 2, wherein the double-hump graded refractive index space division splitter is disposed in alignment with a central axis of the lens.

4. The three-dimensional space-division Y-splitter for multicore optical fibers according to claim 3, wherein each hump of the double-hump has dimensions of approximately 995×60×9 µm.

5. The three-dimensional space-division Y-splitter for multicore optical fibers according to claim 1, wherein each hump of the double-hump graded refractive index space division splitter has a parabolic profile characterized by the relation:

$$n_2(y)=n_o-4.4*10^{-6}(y\pm20)^2,$$

where 20 and −20 µm correspond to the left (−60 µm<y<0) and right (0<y<60 µm) hump, respectively.

6. The three-dimensional space-division Y-splitter for multicore optical fibers according to claim 1, wherein the separator has a center portion disposed in alignment with a central axis of the double-hump graded refractive index space division splitter.

7. The three-dimensional space-division Y-splitter for multicore optical fibers according to claim 1, wherein the two waveguides of said separator are rectangular waveguides, each of the waveguides having dimensions of 1090×133×9 µm, each of the waveguides having a graded-index profile characterized by the relation:

$$n_3(y)=n_o-4.4*10^{-6}(y\pm78.5)^2,$$

where the right and left WGs are centered at 78.5 µm and −78.5 µm, respectively, and the overall separation between output split beams is adjusted at 2×125=250 µm.

8. The three-dimensional space-division Y-splitter for multicore optical fibers according to claim 1, wherein the waveguides defined by said plurality of Y-sub-splitters are separated vertically.

9. The three-dimensional space-division Y-splitter for multicore optical fibers according to claim 1, wherein the multicore optical fibers have homogeneous identical step-index single-mode cores arranged in a triangular lattice.

10. The three-dimensional space-division Y-splitter for multicore optical fibers according to claim 9, wherein a core diameter is approximately 9 µm and a cladding diameter is approximately 125 µm.

11. The three-dimensional space-division Y-splitter for multicore optical fibers according to claim 10, wherein adjacent cores in the multicore optical fibers are separated by approximately 40 µm.

12. The three-dimensional space-division Y-splitter for multicore optical fibers according to claim 11, wherein the Y-splitter has cladding having a refractive index of 1.45 and a relative refractive index difference of 0.35%, resulting in a core refractive index of approximately 1.4551.

13. The three-dimensional space-division Y-splitter for multicore optical fibers according to claim 12, wherein the cladding has dimensions of 400×125 µm and a refractive index matching the refractive index of the multicore optical fiber cladding.

14. The three-dimensional space-division Y-splitter for multicore optical fibers according to claim 1, wherein the multicore optical fibers are disposed in a manner that is rotated by 19° around their longitudinal axis, thereby providing a line-of-sight view between cores in the waveguide of each said Y-sub-splitter, resulting in a vertical separation between adjacent waveguides equal to approximately 4 µm.

* * * * *